US008416250B1

(12) United States Patent
Tavares

(10) Patent No.: US 8,416,250 B1
(45) Date of Patent: Apr. 9, 2013

(54) SIMULATING VERTEX ATTRIBUTE ZERO

(75) Inventor: Greggory Alan Tavares, San Francisco, CA (US)

(73) Assignee: Google Inc., Mountain View, CA (US)

( * ) Notice: Subject to any disclaimer, the term of this patent is extended or adjusted under 35 U.S.C. 154(b) by 206 days.

(21) Appl. No.: 13/107,174

(22) Filed: May 13, 2011

(51) Int. Cl.
G06T 1/00 (2006.01)
G06T 15/00 (2011.01)
(52) U.S. Cl. ...................................................... 345/522
(58) Field of Classification Search .................. 345/522
See application file for complete search history.

(56) References Cited

U.S. PATENT DOCUMENTS

| 2007/0257924 | A1* | 11/2007 | Quarre et al. | 345/522 |
|---|---|---|---|---|
| 2008/0141131 | A1* | 6/2008 | Cerny et al. | 715/716 |
| 2008/0211827 | A1* | 9/2008 | Donovan et al. | 345/582 |
| 2009/0231332 | A1* | 9/2009 | Woo et al. | 345/419 |
| 2011/0242119 | A1* | 10/2011 | Bolz et al. | 345/522 |

OTHER PUBLICATIONS

Lee, Hwanyong, and Nakhoon Baek. "Implementing OpenGL ES on OpenGL." Consumer Electronics, 2009. ISCE'09. IEEE 13th International Symposium on. IEEE, 2009.*
Pulli, Kari. "New APIs for mobile graphics." Proc. SPIE Electronic Imaging: Multimedia on Mobile Devices II 6074 (2006): 1-13.*
Hung, Chih-Yang. "OpenGL ES-based Emulator with Performance Tuning in the 3D Application Development Platform for Embedded Systems." (2009).*

"glActiveTexture—select active texture unit" [online], copyrght 1991-2006, http://www.khronos.org/opengles/sdk/docs/man/xhtml/glActiveTexture.xml, 1 page.
"glBind Texture—bind a named texture to a texturing target", [online], copyright 1991-2006, http://www.khronos.org/opengles/sdk/docs/man/xhtml/glBindTexture.xml, 2 pages.
"glGenTextures—generate texture names", [online], copyright 1991-2006, http://www.khronos.org/opengles/sdk/docs/man/xhtml/glGenTextures.xml, 2 pages.
"glDeleteTextures—delete named textures", [online], copyright 1991-2006, http://www.khronos.org/opengles/sdk/docs/man/xhtml/glDeleteTextures.xml, 2 pages.
"glCopyTexImage2D—copy pixels into a 2D texture image", [online], copyright 1991-2006, http://www.khronos.org/opengles/sdk/docs/man/xhtml/glCopyTexImage2D.xml, 3 pages.
"glCompressedTexImage2D—specify a two-dimensional texture image in a compressed format", [online], copyright 1991-2006, http://www.khronos.org/opengles/sdk/docs/man/xhtml/glCompressedTexImage2D.xml, 3 pages.

(Continued)

Primary Examiner — Aaron M Richer
Assistant Examiner — Vu Nguyen
(74) Attorney, Agent, or Firm — Lerner, David, Littenberg, Krumholz & Mentlik, LLP

(57) ABSTRACT

Aspects of the invention relate generally to enforcing elements of the OpenGL ES specification when emulating on top of OpenGL. More specifically, systems and methods herein allow a user to simulate the features of VertexAttrib #0 of OpenGL ES while using OpenGL. For example, by tracking a user's use of various functions, the use may be able to set VertexAttrib #0 to a constant value and query OpenGL for this value.

21 Claims, 9 Drawing Sheets

OTHER PUBLICATIONS

"glLinkProgram—link a program object" [online], copyright 2003-2005, http://www.khronos.org/opoengles/sdk/docs/man/xhtml/glLinkProgram.xml, 3 pages.
"glTexImage2D—specify a two-dimensional texture image", [online], copyright 1991-2006, http://www.khronos.org/opengles/sdk/docs/man/xhtml/glTexImage2D.xml, 4 pages.
"glTexParameter—set texture parameters", [online], copyright 1991-2006, http://www.khronos.org/opengles/sdk/docs/man/xhtml/glTexParameter.xml, 5 pages.
"glUseProgram—install a program object as part of current rendering state", [online], copyright 2003-2005, http://www.khronos.org/opengles/sdk/docs/man/xhtml/glUseProgram.xml, 2 pages.
"glUniform—specify the value of a uniform variable for the current program object" [online], Copyright 2003-2005, http:// www.khronos.org/opengles/sdk/docs/man/xhtml/glUniform.xml, 6 pages.
"man page VertexAttribPointer—define an array of generic vertex attribute data" [online]. [Retrieved Feb. 9, 2011: http://www.khronos.org/opengles/sdk/docs/man/xhtml/glVertexAttribPointer.xml, 3 pages.
"man page glUseProgram—install a program object as part of current rendering state" [online] [Retrieved Feb. 9, 2011. Retrieved from the Internet: http://www.khronos.org/opengles/sdk/docs/man/xhtml/glUseProgram.xml, 2 pages.
"man page glLinkProgram—link a program object" [online]. [Retrieved Feb. 9, 2011]. Retrieved from the internet: http://www.khronos.org/opengles/sdk/docs/man/xhtml/glLinkProgram.xml, 3 pages.
"man page glGenBuffers—generate buffer object names" [online]. [Retrieved Feb. 9, 2011]. Retrieved from the internet: http://www.khronos.org/opengles/sdk/docs/man/xhtml/glGenBuffers.xml, 2 pages.
"man page glEnableVertexAttribArray—enable or disable a generic vertex attribute array" [online]. [Retrieved Feb. 9, 2011). Retrieved from the internet: http://www.khronos.org/opengles/sdk/docs/man/xhtml/glEnableVertexAttribArray.xml, 2 pages.
"man page glDrawArrays—render primitives from array data" [online]. [Retrieved Feb. 9, 2011]. Retrieved from the internet: http://www.khronos.org/opengles/sdk/docs/man/xhtml/glDrawElements.xml, 2 pages.
"man page glDrawElements—render primitives from array data" [online]. [Retrieved Feb. 9, 2011] Retrieved from the internet: http://www.khronos.org/opengles/sdk/docs/man/xhtml/glDrawArrays.xml, 2 pages.
"man page glDelet3eBuffers—delete named buffer objects" [online]. {Retrieved Feb. 9, 2011]. Retrieved from the internet: http://www.khronos.org/opengles/sdk/docs/man/xhtml/glDeleteBuffers.xml, 1 page
"man page glBufferSubData—update a subset of a buffer object's data store" [online]. [Retrieved Feb. 9, 2011]. Retrieved from the internet: http://www.khronos.org/opengles/sdk/docs/man/xhtml/glBufferSubData.xml, 2 pages.
"man page glBufferData—create and initialize a buffer object's data store" [online]. [Retrieved Feb. 9, 2011]. Retrieved from the internet: http://www.khronos.org/opengles/sdk/docs/man/xhtml/glBufferData.xml, 3 pages.
"man page glBindBuffer—bind a named buffer object" [online]. [Retrieved Feb. 9, 2011]. Retrieved from the internet: http://www.khronos.org/opengles/sdk/docs/man/xhtml/glBindBuffer.xml, 2 pages.
"log of/trunk/src/gpu/command_buffer/service/shader_manager.cc" [online]. [Retrieved Feb. 9, 2011]. Retrieved from the internet: http://src.chromium.org/viewvc/chrome/trunk/src/gpu/command_buffer/service/shader$_{13}$ manager.cc?view=log, 3 pages.
log of/trunk/src/gpu/command_buffer/service/shader_manager.h [online]. [Retrieved Feb. 9, 2011). Retrieved from the internet: http://src.chromium.org/viewvc/chrome/trunk/src/gpu/command_buffer/service/shader_manager.h?view=log, 5 pages.
log of/trunk/src/gpu/command_buffer/service/program_manager.cc [online]. [Retrieved Feb. 9, 2011). Retrieved from the internet: http://src.chromium.org/viewvc/chrome/trunk/src/gpu/command_buffer/service/program_manager.cc?view=log, 7 pages.
"log of/trunk/src/gpu/command_buffer/service/program_manager.h" [online]. [Retrieved Feb. 9, 2011]. Retrieved from the internet: http://src.chromium.org/viewvc/chrome/trunk/src/gpu/command_buffer/service/program_manager.cc?view=log, 6 pages.
"log of/trunk/src/gpu/command_buffer/service/buffer" [online]. [Retrieved Feb. 9, 2011]. Retrieved from the internet: http://src.chromium.org/viewvc/chrome/trunk/src/gpu/command_buffer/service/buffer_manager.cc?view=log, 6 pages.
"log of/trunk/src/gpu/command_buffer/service/buffer_manager.h" [online]. [Retrieved Feb. 9, 2011]. [Retrieved from internet: http://src.chromium.org/viewvc/chrome/trunk/src/gpu/command_buffer/service/program_manager.h?view=log, 6 pages.
"view of/trunk/src/gpu/command_buffer/service/gles2_cmd_decoder_autogen.h" [online]. [Retrieved Feb. 9, 2011]. Retrieved from the internet: http://src.chromium.org/viewvc/chrome/trunk/src/gpu/command_buffer/service/gles2_cmd_decoder_autogen.h?view=markup, 46 pages.
"view of trunk/src/gpu/command_buffer/service/gles2_cmd_decoder.cc" [online]. [Retrieved Feb. 9, 2011]. Retrieved from the internet: http://src.chromium.org/viewvc/chrome/trunk/src/gpu/command_buffer/service/gles2_cmd_decoder.cc?view=markup, 104 pages.
"view of/trunk/src/gpu/command_buffer/client/gles2_cmd_helper.cc" [online]. [Retrieved Feb. 9, 2011]. Retrieved from the internet http://src.chromium.org/viewvc/chrome/trunk/src/gpu/command_buffer/client/gles2_cmd_helper.cc?view=markup, 1 page.
"view of/trunk/src/gpu/command_buffer/client/gles2_cmd_helper.h" [online]. [Retrieved Feb. 9, 2011]. Retrieved from the internet: http://src.chromium.org/viewvc/chrome/trunk/src/gpu/command_buffer/client/gles2_cmd_helper.h?view=markup, 3 pages.
"view of/trunk/src/gpu/command_buffer/client/gles2_implementation.cc" [online]. [Retrieved Feb. 9, 2011). Retrieved from the internet: http://src.chromium.org/viewvc/chrome/trunk/src/gpu/command_buffer/client/gles2_implementation.cc?view=markup, 29 pages.
"log of/trunk/src/gpu/command_buffer/client/gles2_implementation_autogen.h" [online]. [Retrieved Feb. 9, 2011]. Retrieved from the internet: http://src.chromium.org/viewvc/chrome/trunk/src/gpu/command_buffer/client/gles2_implementation_autogen.h?view=markup, 16 pages.
"log of trunnk/src/gpu/command_buffer/client/gles2_implementation.h" [online]. [Retrieved Feb. 9, 2011]/ Retrieved from the internet: http://src.chromium.org/viewvc/chrome/trunk/src/gpu/command_buffer/client/gles2_implementation.h?view=markup, 7 pages.
"log of trunk/src/gpu/command_buffer/client/gles2_c_lib_autogen.h" [online]. [Retrieved Feb. 9, 2011). Retrieved from the internet: http://src.chromium.org/viewvc,/chrome/trunk/src/gpu/command_buffer/client/gles2_c_lib_autogen.h?view=markup, 16 pages.
"glGetVertexAttrib—return a generic vertex attribute parameter", [online], copyright 2003-2005, http://www.khronos.org/opengles/sdk/docs/man/xhtml/glGetVertexAttrib.xml, 3 pages.
"glGetVertexAttribPointerv—return the address of the specified generic vertex attribute pointer", [online], copyright 2003-2005, http://www.khronos.org/opengles/sdk/docs/man/xhtml/glGetVertexAttribPointerv.xml, 2 pages.
"glVertexAttrib—specify the value of a generic vertix attribute", [online], copyright 2003-2005, http://www.khronos.org/opengles/sdk/docs/man/xhtml/glVertexAttrib.xml, 3 pages.
"glEnableVertexAttribArray—enable or disable a generic vertex attribute array", [online], copyright 2003-2005, http://www.khronos.org/opengles/sdk/docs/man/xhtml/glEnableVertexAttribArray.xml, 2 pages.
"glDrawArrays—render primitives from array data", [online], copyright 1991-2006, http://www.khronos.org/opengles/sdk/docs/man/xhtml/glDrawArrays.xml, 2 pages.
"glDrawElements—render primitives from array data", [online], copyright 1991-2006, http://www.khronos.org/opengles/sdk/docs/man/xhtml/glDrawElements.xml, 2 pages.

* cited by examiner

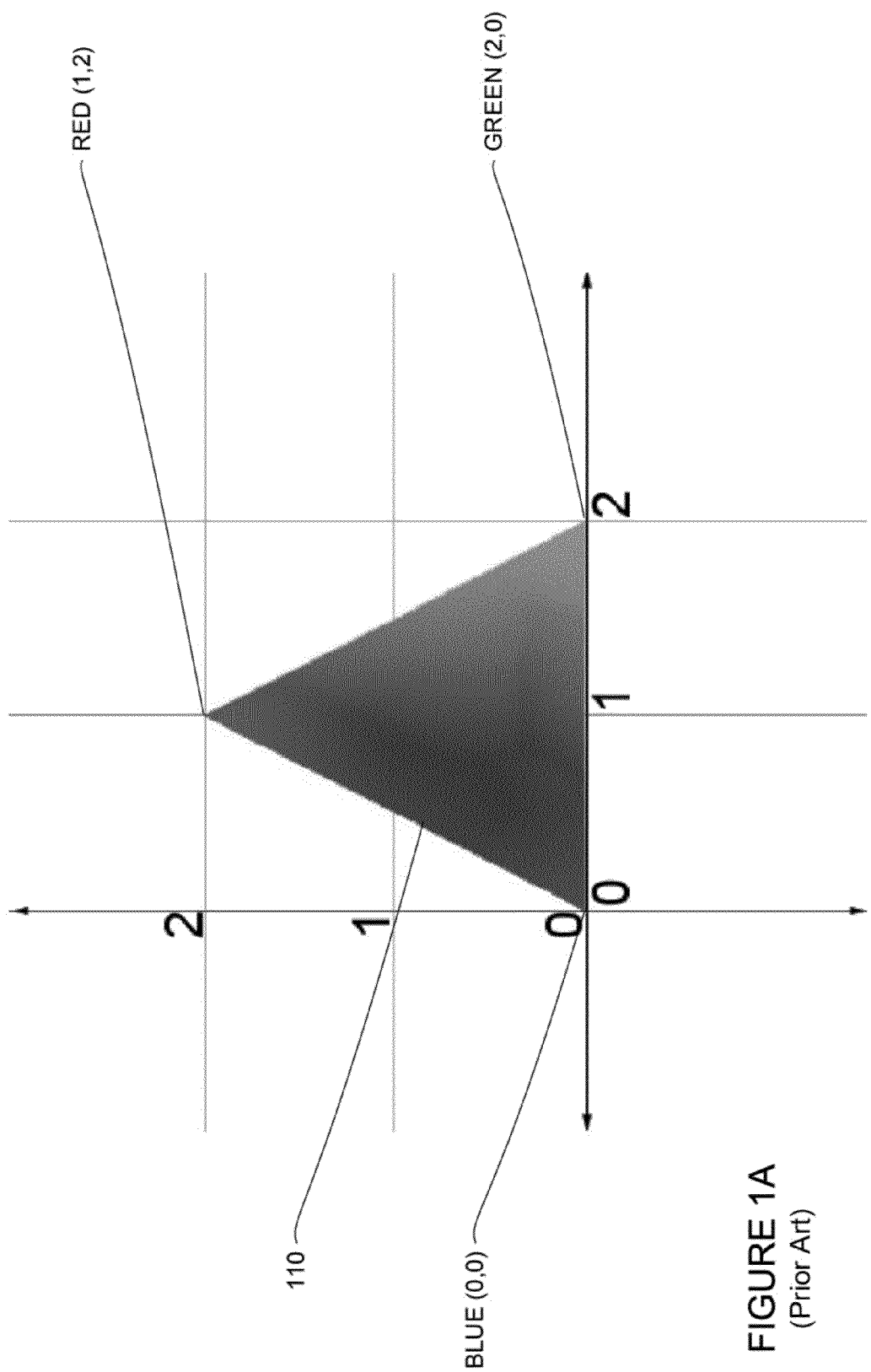

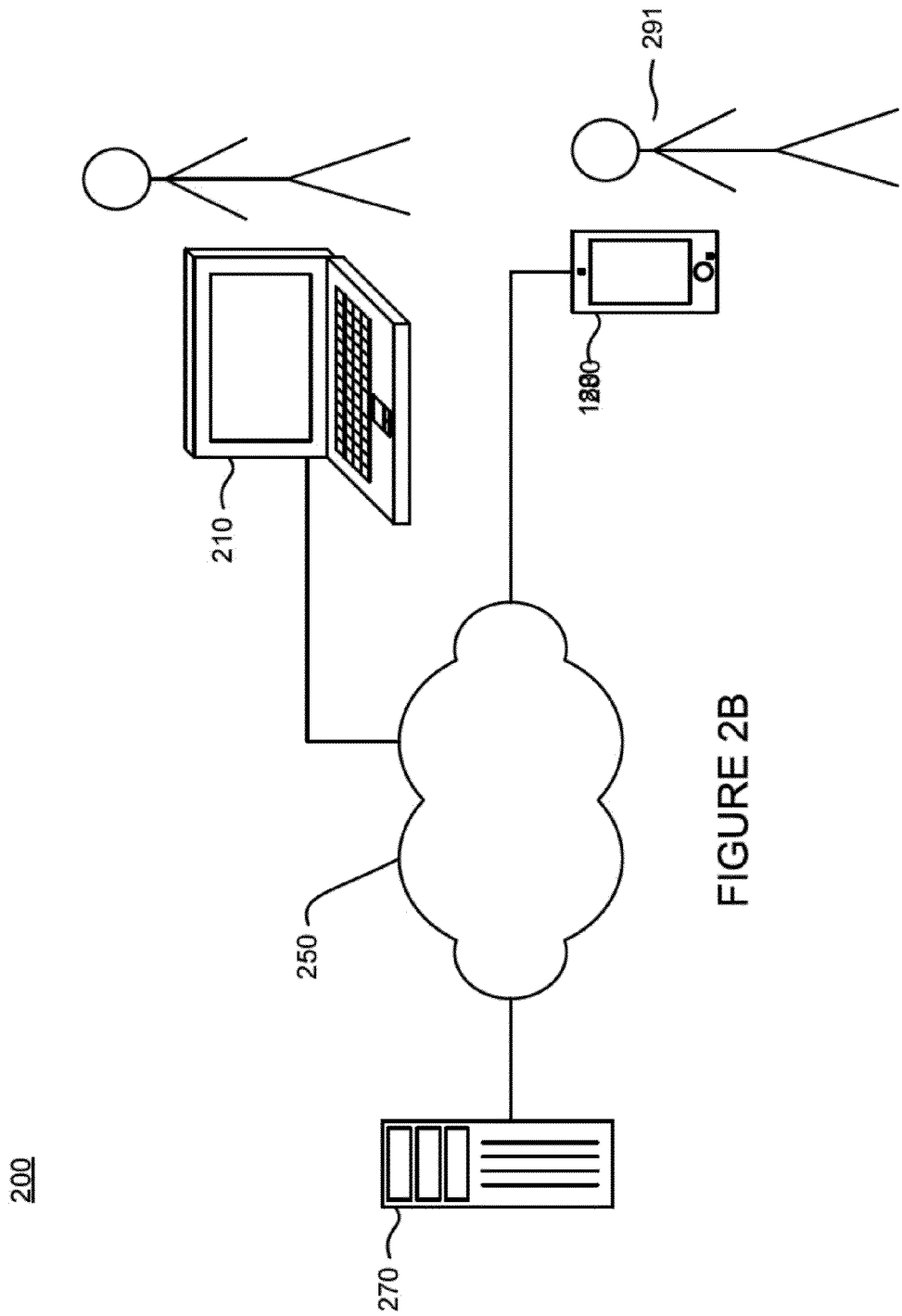

SIMULATING VERTEX ATTRIBUTE ZERO

BACKGROUND OF THE INVENTION

Graphics application programming interfaces ("API") are used by programmers to create 2D and 3D graphics. The Open Graphics Library ("Open GL") is a widely used API. The Open GL architecture allows programmers to produce consistent visual display results on any OpenGL API-compliant hardware regardless of the operating system. OpenGL for embedded systems ("OpenGL ES") is a subset of the OpenGL API designed for embedded devices such as mobile phones, PDAs, and video game consoles.

For example, triangle 110 depicted in FIG. 1A includes three vertices, a red vertex at (1,2), a blue vertex at (0,0), and a green vertex at (0,2). This image may be drawn by using two arrays: a position array, PositionArray: [(0,0),(1,2),(2,0)] and a color array, ColorArray: [blue,red,green]. The image may be drawn in OpenGL or OpenGL ES by calling a function which renders primitives from the array data and identifying the two arrays for the vertex attributes:

VertexAttrib #0→PositionArray
VertexAttrib #1→ColorArray.

In order to draw another triangle in a solid color, for example in orange, the user may instruct OpenGL ES to use a constant color:

VertexAttrib #0→PositionArray
VertexAttrib #1→Constant Orange.

OpenGL or OpenGL ES may then use orange for all 3 vertices of the triangle and generate an orange triangle 120 as shown in FIG. 1B.

Similarly, using OpenGL ES, VertexAttrib #0 may be set to a constant value. However if the user is using OpenGL and VertexAttrib #0 is set to a constant value, OpenGL will not draw anything at all. In another example, if the user queries OpenGL asking "to what constant value did I set VertexAttrib #0?," OpenGL will not identify the constant. Thus, for at least two examples above, OpenGL and OpenGL ES may provide different results when displaying the results the same code.

BRIEF SUMMARY OF THE INVENTION

Aspects of the invention relate generally to enforcing elements of the OpenGL ES specification when emulating on top of OpenGL. More specifically, systems and methods herein allow a user to emulate the features of VertexAttrib #0 of OpenGL ES while using OpenGL. For example, by tracking a user's use of various functions, the use may be able to set VertexAttrib #0 to a constant value and query OpenGL for this value.

This allows for a consistent API. For example, when a user is working with OpenGL ES, from the user's point of view, OpenGL ES should operate as its specification provides. Without the emulation of VertexAttrib #0 described above, the user may generate a program which would behave differently on different systems. If the user was running the same program on a personal computer which supports OpenGL, the user may observe a first behavior from the program. If the user was running the same program on a mobile phone which supports OpenGL ES, the user may observe a second behavior different from the first behavior. Thus, but utilizing the emulation of VertexAttrib #0, the user may experience consistent results.

One aspect of the invention provides a computer-implemented method. The method includes receiving a request to set an attribute to use a particular constant value by utilizing a first function; calling a second version of the first function; using the second version of the first function to store the particular constant value; setting the attribute to use the particular constant value; receiving a request to draw an image using a second function, the attribute, and a first array of N values; and determining, by a processor, whether the attribute is set to use a constant value. If the attribute is set to use a constant value, then the method also includes generating, by the processor, a second array of at least N values based on the stored particular constant value and calling the second function to draw the image using the second array.

In one example, the method also includes, after generating the second array, setting the attribute to the second array; drawing the image using the attribute set to the second array; and after drawing the image, setting the attribute to use the particular constant value. In another example, the method also includes receiving a request to identify the attribute using a third function; calling a second version of the third function to retrieve the stored constant value of the second version of the first function; and identifying the stored constant value as the attribute.

In yet another example, determining whether the attribute is set to use a constant value is based on querying the attribute. In one alternative, if the attribute is not set to use a constant value, the method also includes calling the second function and drawing the image using the attribute.

In a further example, the method also includes tracking use of a third function that enables generic vertex attribute arrays in conjunction with the attribute; and tracking use of a fourth function that disables generic vertex attribute arrays in conjunction with the attribute. In this example, determining whether the attribute is set to use a constant value is based on the use of the third function in conjunction with the attribute and the use of the fourth function in conjunction with the attribute. In one alternative, the method also includes, if the attribute is not set to use a constant value, calling the second function and drawing the image using the attribute.

Another aspect of the invention provides a computer which includes memory storing a graphics library including a plurality of functions. The computer also includes processor coupled to the memory. The processor is programmed to receive a request to set an attribute to use a particular constant value by utilizing a first function; call a second version of the first function; use the second version of the first function to store the particular constant value; set the attribute to use the particular constant value; receive a request to draw an image using a second function, the attribute and a first array of N values; and determine whether the attribute is set to use a constant value. If the attribute is set to use a constant value, then the processor is further programmed to generate a second array of at least N values based on the stored particular constant value and call the second function to draw the image using the second array.

In one example, the processor is also programmed after generating the second array, to set the attribute to the second array; draw the image using the attribute set to the second array; and after drawing the image, set the attribute to use the particular constant value. In another example, the processor is also programmed to receive a request to identify the attribute using a third function; call a second version of the third function to retrieve the stored constant value of the second version of the first function; and identify the stored constant value as the attribute.

In yet another example, the processor is also programmed to determine whether the attribute is set to use a constant value based on querying the attribute. In one alternative, if the attribute is not set to use a constant value, the processor is also programmed to call the second function and draw the image using the attribute.

In a further example, the processor is also programmed to track use of a third function that enables generic vertex attribute arrays in conjunction with the attribute; track use of a fourth function that disables generic vertex attribute arrays in conjunction with the attribute; and determine whether the attribute is set to use a constant value based on the use of the third function in conjunction with the attribute and the use of the fourth function in conjunction with the attribute. In one alternative, the processor is also programmed, if the attribute is not set to use a constant value, to call the second function and draw the image using the attribute.

Yet another aspect of the invention provides a tangible computer-readable storage medium on which computer readable instructions of a program are stored. The instructions, when executed by a processor, cause the processor to perform a method of drawing an image using an array. This method includes receiving a request to set an attribute to use a particular constant value by utilizing a first function; calling a second version of the first function; using the second version of the first function to store the particular constant value; setting the attribute to use the particular constant value; receiving a request to draw an image using a second function, the attribute, and a first array of N values; and determining whether the attribute is set to use a constant value. If the attribute is set to use a constant value, the method also includes generating a second array of at least N values based on the stored particular constant value and calling the second function to draw the image using the second array.

In one example, the method also includes, after generating the second array, setting the attribute to the second array; drawing the image using the attribute set to the second array; and after drawing the image, setting the attribute to use the particular constant value. In another example, the method also includes receiving a request to identify the attribute using a third function; calling a second version of the third function to retrieve the stored constant value of the second version of the first function; and identifying the stored constant value as the attribute.

In yet another example, determining whether the attribute is set to use a constant value is based on querying the attribute. In one alternative, the method also includes, if the attribute is not set to use a constant value, calling the second function and drawing the image using the attribute.

In a further example, the method also includes tracking use of a third function that enables generic vertex attribute arrays in conjunction with the attribute; tracking use of a fourth function that disables generic vertex attribute arrays in conjunction with the attribute; and determining whether the attribute is set to use a constant value based on the use of the third function in conjunction with the attribute and the use of the fourth function in conjunction with the attribute. In one alternative, the method also includes, if the attribute is not set to use a constant value calling the second function and drawing the image using the attribute.

BRIEF DESCRIPTION OF THE DRAWINGS

FIG. 1A is an exemplary graphic.
FIG. 2B is a pictorial diagram of the system of FIG. 2A.

DETAILED DESCRIPTION

The aspects, features and advantages of the present invention will be appreciated when considered with reference to the following description of embodiments and accompanying figures. The same reference numbers in different drawings may identify the same or similar elements. Furthermore, the following description does not limit the present invention; rather, the scope of the invention is defined by the appended claims and equivalents.

In one aspect of the invention, an emulator receives a request to set VertexAttrib #0 (attribute zero) using the function glVertexAttrib. For example, the emulator may receive a request to set VertexAttrib #0 to a constant value. Rather than calling the "real" version of the function glVertexAttrib, a wrapped version of this function is called. If the attribute being set to use a constant value is vertexattrib #0, the wrapper stores this value. Otherwise, if a different attribute is being affected, the real glVertexAttrib function is called.

The emulator then receives a request to draw an image using a glDraw function, either glDrawArrays or glDrawElements, using a first array associated with a number of values. Again, rather than calling the "real" glDraw function, the emulator calls a wrapped version of the glDraw function. The emulator then determines whether VertextAttrib #0 is set to use a constant value by querying the state of attribute zero using glGetVertexAttrib. If VertexAttrib #0 is set to use an array, the emulator calls the real glDraw function to use VertexAttrib #0 to draw the image.

If VertexAttrib #0 is not set to use an array, the emulator generates a second array of at least the number of values of the first array identified in the request and fills the array with the stored constant value. VertexAttrib #0 is set to use the second array. The emulator then calls the glDraw function identified in the request to draw the image, and draws the image using the second array. VertexAttrib #0 is then set to use the constant value. Thus, when the user queries VertexAttrib #0, the emulator may identify this value as a constant value (rather than an array).

If the emulator receives a request to query the constant value using the function glGetVertexAttrib and the attribute is not VertexAttrib #0, the "real" glGetVertexAttrib is called. If the attribute being queried is VertexAttrib #0, the stored constant value is returned. Thus, the user will see the object actually drawn using the second array but may conclude that object was drawn using the constant value.

Figure 2A:
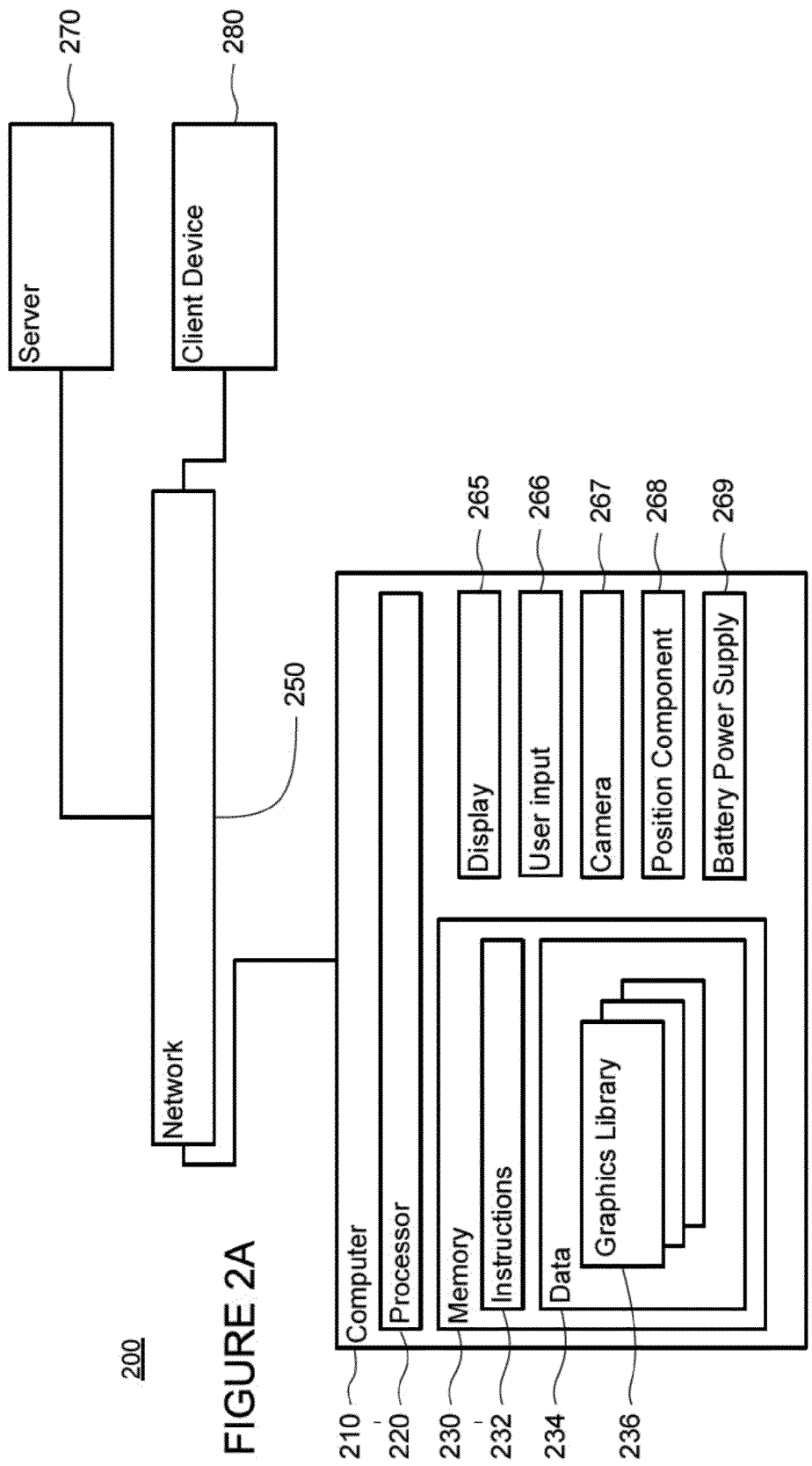
FIG. 2A is a functional diagram of a system for use with aspects of the invention.

As shown in FIGS. 2A-B, a system 200 in accordance with one aspect of the invention includes a computer 210 containing a processor 220, memory 230 and other components typically present in general purpose computers.

The memory 230 stores information accessible by processor 220, including instructions 232, and data 234 that may be executed or otherwise used by the processor 220. The memory 230 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 232 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 234 may be retrieved, stored or modified by processor 220 in accordance with the instructions 232. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations or servers) or information that is used by a function to calculate the relevant data.

The processor 220 may be any conventional processor, such as processors from Intel Corporation or Advanced Micro Devices. Alternatively, the processor may be a dedicated controller such as an ASIC. Although FIG. 2A functionally illustrates the processor and memory as being within the same block, it may be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, computer or memory may be understood to include references to a collection of processors or computers or memories that may or may not operate in parallel.

The computer 210 may be at one node of a network 250 and capable of directly and indirectly receiving data from other nodes of the network. Computer 210 may be a client device capable of sending and receiving information with other devices, such as client device 280 and server 270, on the network. The client device may send and receive information over the network and display information to a user on display 265. Computer 210 may also comprise a plurality of computers that exchange information with different nodes of a network for the purpose of receiving, processing and transmitting data.

Network 250, and intervening nodes between client 210 and other devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 2A-B, it should be appreciated that a typical system can include a large number of connected computers.

Client device 210 may be a personal computer intended for use by a person 291, and have all of the components normally used in connection with a personal computer such as an electronic display 265 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 267, position component 268, accelerometer, speakers, a network interface device, a battery power supply 269 or other power source, and all of the components used for connecting these elements to one another.

Although client device 210 may comprise a full-sized personal computer, it may alternatively comprise mobile devices capable of wirelessly exchanging data with a server over a network such as the Internet. By way of example only, client device 210 may be a wireless-enabled PDA, a cellular phone, netbook, or tablet PC capable of obtaining information via the Internet or other network. The user may input information using an input device such as a small keyboard, a mouse, a keypad, or a touch screen.

Graphics library 236 may include various functions that may be used by client devices to render images from memory. For example, these functions may include functions that: render primitives from array data (such as glDrawArrays or glDrawElements), enable or disable a generic vertex attribute array (such as glEnableVertexAttribArray or glDisableVertexAttribArray), return a generic vertex attribute parameter (such as glGetVertexAttrib), specify the value of a generic vertex attribute (such as glVertexAttrib), and return the address of the specified generic vertex attribute pointer (such as glGetVertexAttribPointerv).

The graphics library may also include secondary or different versions of the functions described above. For example, these different versions may be used to track and record when the "real" function is created, edited, used, etc. In some examples, the different versions may be "wrapped" versions of the real function. The wrapped versions may include a wrapper or set of code which operates on a function to determine how the function is executed.

Figure 3:
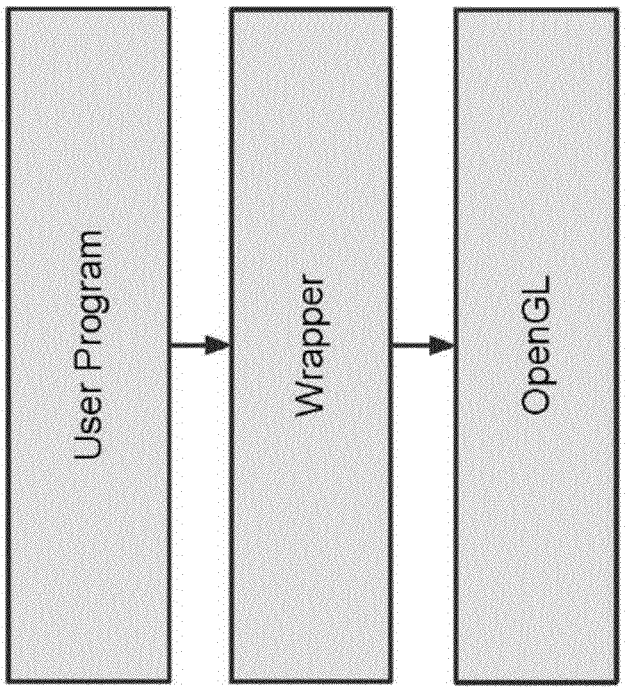
FIG. 3 is a diagram of an exemplary wrapper in accordance with an aspect of the invention.
Figure 3:
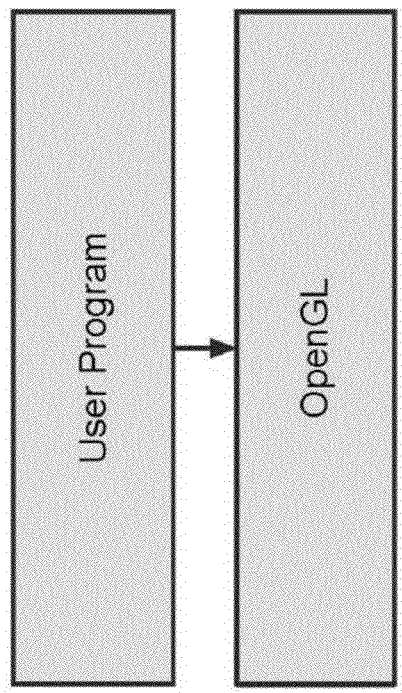

The processor may use the wrappers to monitor the use of the functions and recall their various states. For example, the wrappers may include a single layer or may be multilayered. Diagram 300 of FIG. 3 shows that a standard OpenGL program structure includes the user program (which calls the functions) and OpenGL. The single layer wrapper of diagram 310 acts as an intermediary between the user program and OpenGL.

Figure 4:
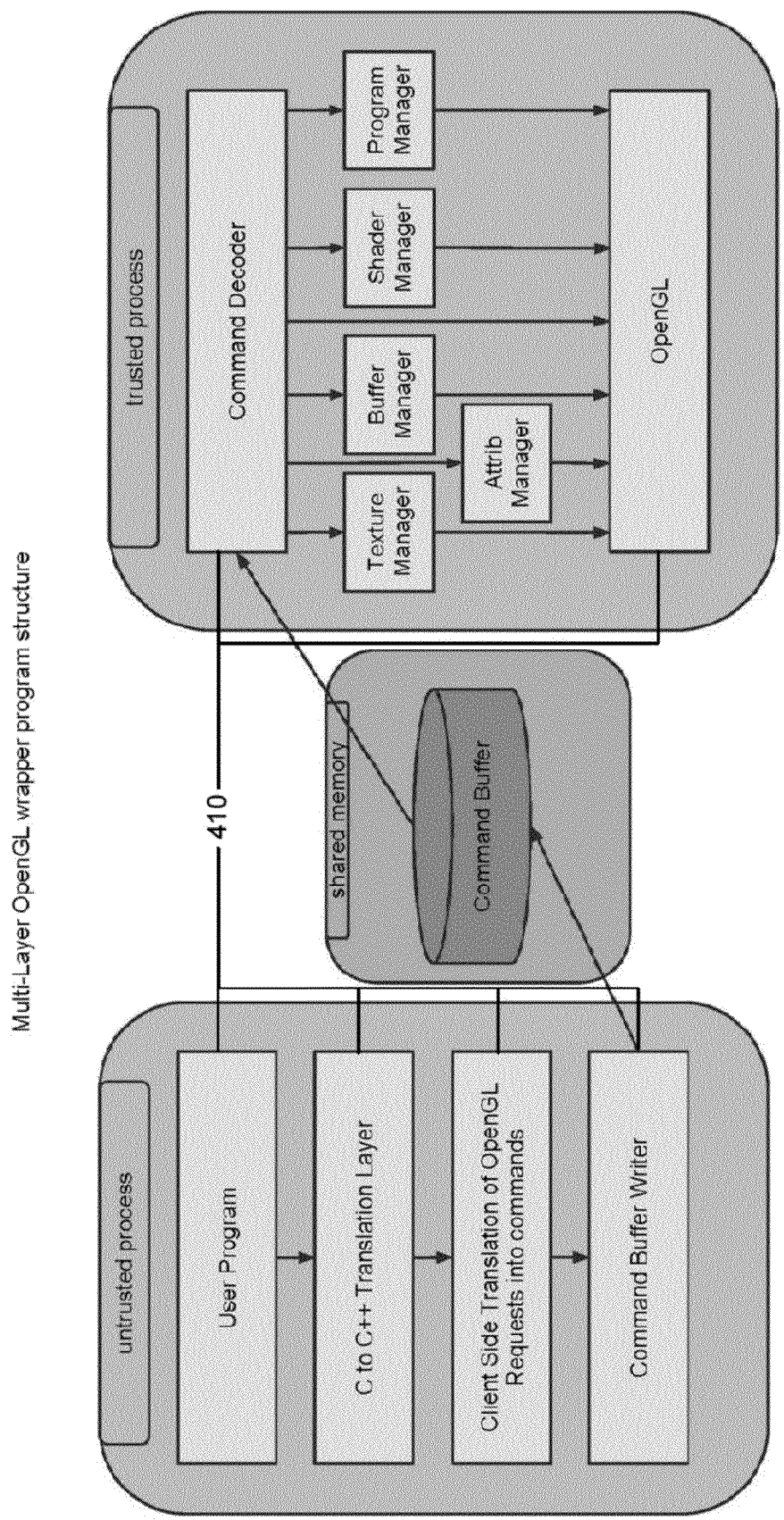
FIG. 4 is another diagram of an exemplary wrapper in accordance with an aspect of the invention.

In another example, shown in FIG. 4, the wrapper may have multiple layers, where each particular layer 410 is depicted as a rectangular block. The first level may include the OpenGL file that defines the OpenGL functions (the "official file"). Minor modifications to this file may allow the emulator to change the calls for the OpenGL ES functions to the calls for the wrappers themselves. In one example, a user program may call a particular function to perform some task. In response, the official file may actually call the particular function's wrapper (or the wrapped version of the function). This may be the second layer of the wrapper. The functions in this second layer of the wrapper may translate from C to C++ and call the third layer of the wrapper. The third layer then uses the C++ to instruct the fourth layer of the wrapper to write commands to memory using a set of low level features. In some examples, these low level features may be defined in about, for example, 78 different files. The commands may be read out of the fifth layer. The fifth layer then calls the real OpenGL function to complete some action. This fifth layer may also utilize a set of classes to assist it in recording values.

It will be understood that in addition to the examples above, various wrapping techniques may be used so long as the emulator is able to perform the operations described herein with regard to each particular function type.

Various operations in accordance with aspects of the invention may now be described. It should also be understood that the following operations do not have to be performed in the precise order described below. Rather, various steps can be handled in a different order or simultaneously, and steps may be added or removed.

A user (here, a programmer) may use the API to draw 3D graphics. For example, user sets the value of VertexAttrib #0. The user may then call glDrawArrays or glDrawElements to draw an image using VertexAttrib #0. Rather than calling the real glDraw (Arrays or Elements) function, the emulator may call a wrapped version of the function and use the wrapped version to examine the state of VertexAttrib #0. The emulator may determine whether VertexAttrib #0 is set to a constant value. If not, the emulator may call the real glDraw function to complete the draw. If VertexAttrib #0 is set to a constant value, the emulator may use the wrapper to generate a new array large enough to complete the specific drawing request. The array may then be filled with the particular constant value, and VertexAttrib #0 is set to use the array. Then the real glDraw function may be called to draw an image using the new array.

Figure 1B:
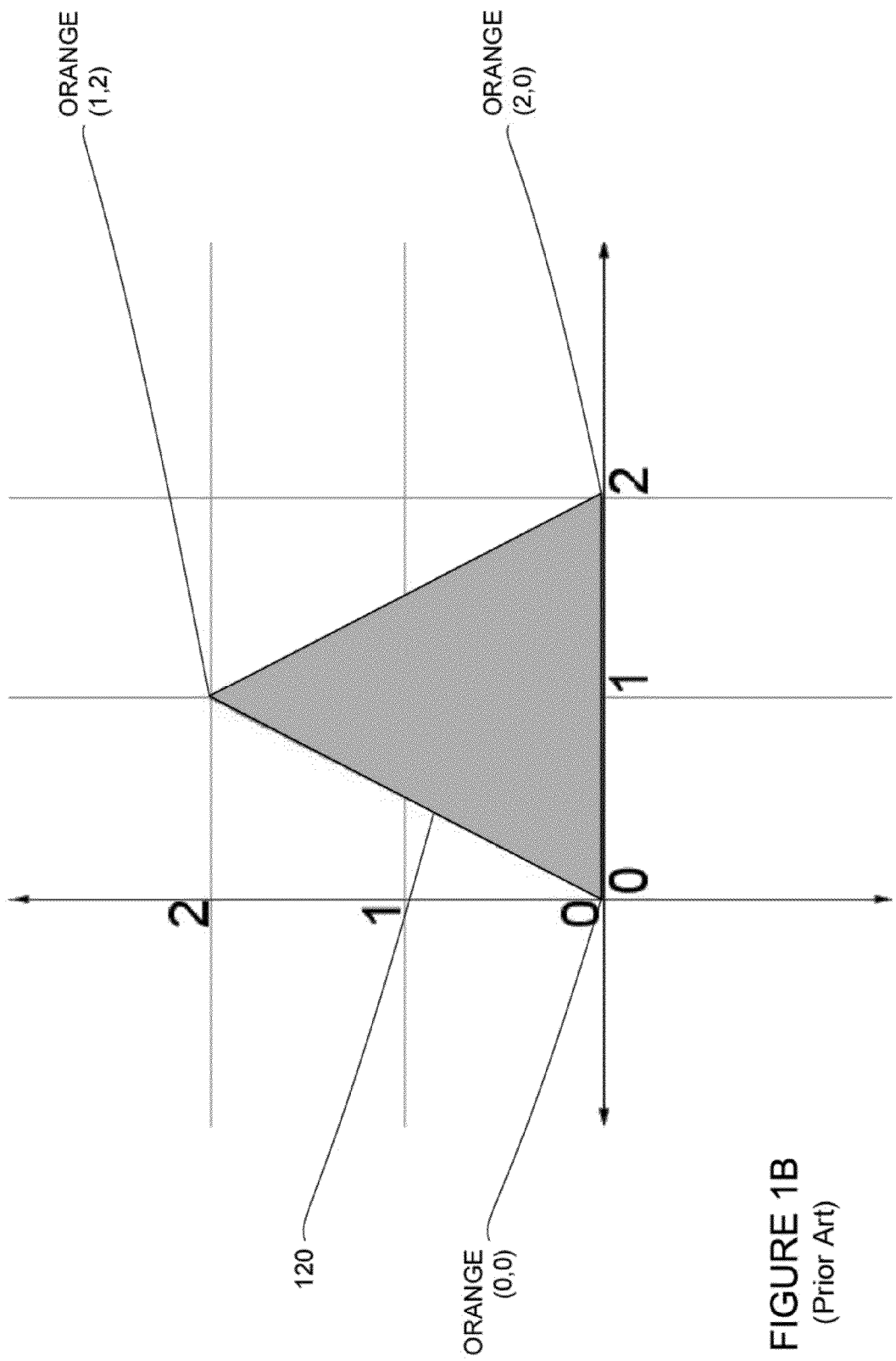
FIG. 1B is another exemplary graphic.

For example, returning to triangle 120 of FIG. 1B, the user may set VertexAttrib #0 to use "Constant Orange," and VertexAttrib #1 to use PositionArray in order to draw triangle 120. In order to set VertexAttrib #0 to use a constant value or an array, the user may call the functions to enable or disable arrays for VertexAttrib #0.

When the user calls glDrawArray to complete the draw, the emulator may call the wrapped version of glDrawArray. Using the wrapper, the emulator may query OpenGL to determine whether VertexAttrib #0 is set to use a constant value. For example, the emulator may query whether VertexAttrib #0 has arrays enabled (is set to use an array) or disabled (is set to use a constant). If set to use a constant, the emulator may generate an array of at least 3 values (the number of values of the PositionArray) and fill the array with the particular value, here, Orange.

However, once the user has set VertexAttrib #0 to a constant value, the user will be unable to directly query OpenGL for the constant value. In other words, OpenGl will provide the user with whether or not VertexAttrib #0 is set to use a constant value but not what that constant value actually is. In order to allow the user to query OpenGL for the constant value, the emulator may use wrapped versions of the functions which return a generic vertex attribute parameter in response to a user request and which specify the value of a generic vertex attribute. For example, in OpenGL, a constant value for VertexAttrib #0 may be set using the function glVertexAttrib, and the user may query the value of this variable using the function glGetVertexAttrib. Again, as noted above, if the user calls glGetVertexAttrib to identify a constant value for VertexAttrib #0, OpenGL will not provide the constant value. Accordingly, the emulator may use wrapped versions of these functions, tracking the usage and storing the states, in order to allow the user to query OpenGL for the constant value.

For example, when the user calls the glVertexAttrib function to set the value of a VertexAttrib, the emulator may actually call the wrapped version of this function. If the user is attempting to set VertexAttrib #0 to a constant value, the wrapper may be used to store the constant value. Again, the real glVertexAttrib function may also be called, and VertexAttrib #0 may be set to the constant value.

Similarly, when the user calls the glGetVertexAttrib function to query the value of a VertexAttrib, the emulator may actually call the wrapped version of this function. If the user is attempting to query the constant value for VertexAttrib #0, the wrapped version of glVertexAttrib may be used to provide the user with the stored constant value. If the user is not attempting to query the constant value for VertexAttrib #0 (in other words determine what the constant value is), the real glGetVertexAttrib function may be called to respond to the query.

When a user calls glDrawArray to complete the draw and the emulator has determined that VertexAttrib #0 is set to use a constant value, the emulator may query the wrapped version of glVertexAttrib to identify the constant value. Once the value is identified, a new array may be generated as described above. Thus, a new array is generated, ColorArray: (Orange, Orange, Orange). VertexAttrib #0 may then be set to use the new ColorArray. Then the real glDrawArray function is called and the image is drawn using the new ColorArray.

Next, if VertexAttrib #0 was previously set to use a constant value, the emulator may set VertexAttrib #0 to use the constant value (or rather, to not use an array). In this regard, if the user queries OpenGL to determine whether VertexAttrib #0 is using a constant or an array value, the emulator will identify a constant value even though a previous draw had been completed using the generated array rather than a constant value. For example, the emulator may set VertexAttrib #0 back to the constant value, Orange. When the user queries VertexAttrib #0, the emulator may return the constant value. The user will see the object actually drawn using an array but may conclude that object was drawn using a constant value.

Figure 5:
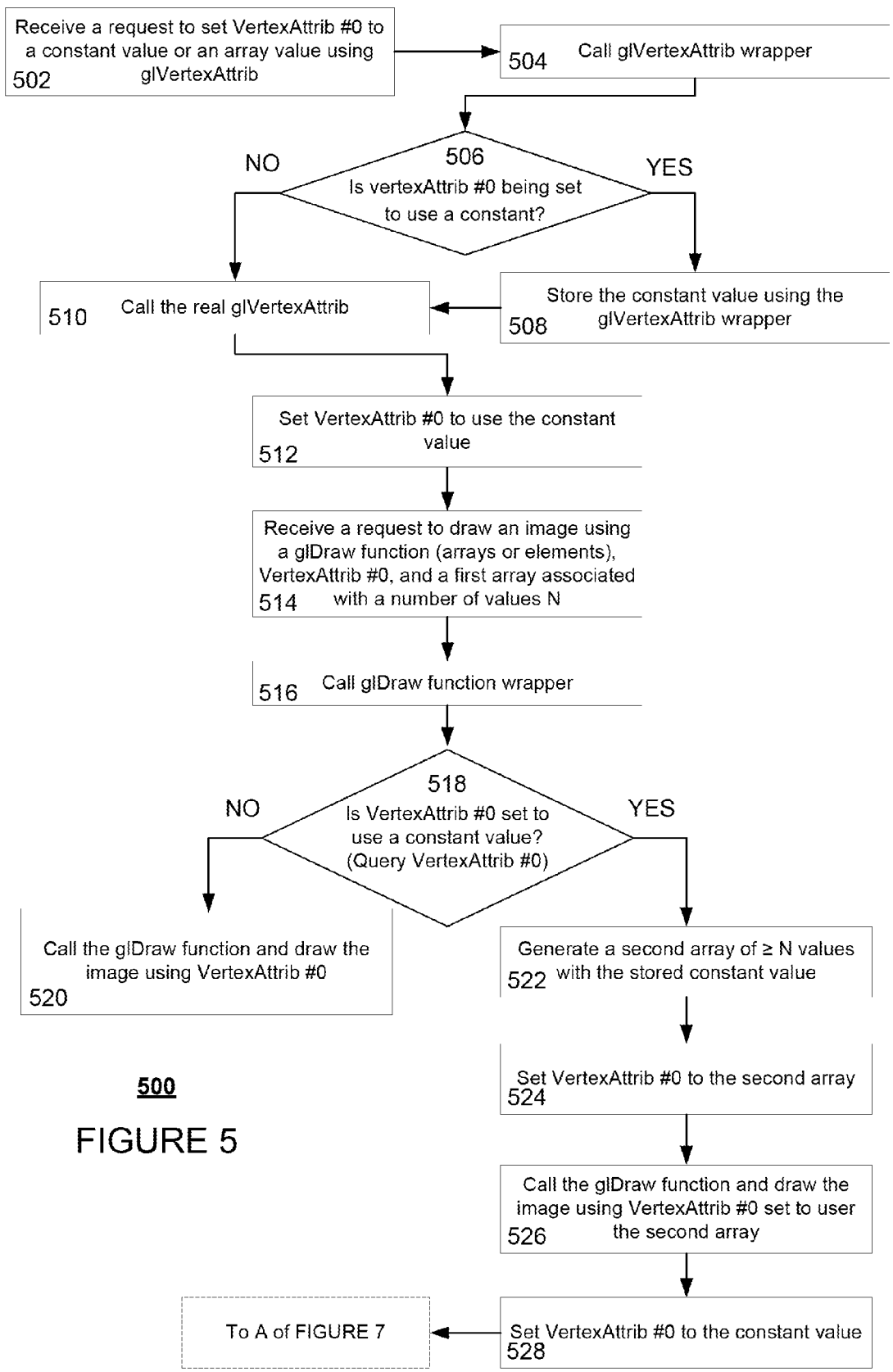
FIG. 5 is an exemplary flow diagram in accordance with an aspect of the invention.

As shown in flow diagram 500 of FIG. 5, the emulator may receive a request to set VertexAttrib #0 to a constant value of an array value using glVertexAttrib at block 502. The emulator may call a wrapped version of the glVertexAttrib wrapper at block 504. The emulator then determines, based on the request, whether VertexAttrib #0 is being set to use a constant at block 506. If so, the emulator may store the constant value using the glVertexAttrib wrapper at block 508 before calling the "real" glVertexAttrib function at block 510. Returning to block 506, if VertexAttrib #0 is not being set to use a constant (it is being set to use an array), the emulator the "real" glVertexAttrib function at block 510. After the "real" glVertexAttrib function has been called at block 510, VertexAttrib is set to use the constant value or the array value (depending upon the original request) at block 512.

The emulator then receives a request to draw an image using a glDraw, either glDrawArrays or glDrawElements, using an array associated with a number of values N at block 514. The emulator calls a wrapped version of the glDraw function at block 516. The emulator next determines whether VertextAttribute #0 is set to use a constant value by querying the state of VertexAttribute #0. If VertexAttribute #0 is not set to use a constant value, the emulator calls the "real" glDraw function and draws the image using VertexAttribute #0 at block 520.

If VertexAttribute #0 is set to use a constant value, the emulator may generate a second array of at least N values using the stored constant value at block 522. The emulatory then sets VertexAttribute #0 to use the second array at block

524. The glDraw function is called and the image is drawn using VertexAttribute #0 set to use the second array. At block 528, VertexAttribute #0 is set to use the constant value.

Figure 7:
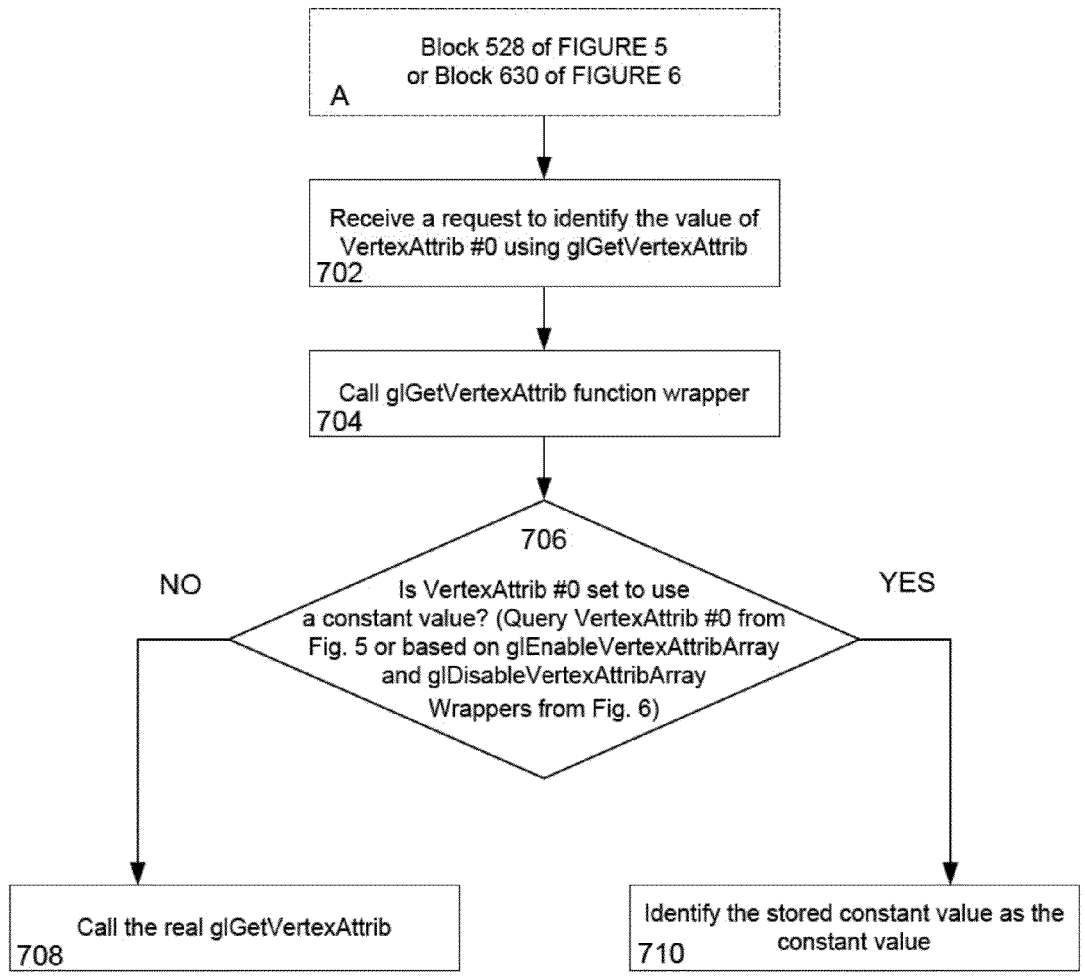
FIG. 7 is yet another exemplary flow diagram in accordance with an aspect of the invention.

Turning to flow diagram 700 of FIG. 7, after VertexAttrib #0 has again been set to use the constant value, for example, at block 528 of FIG. 5, the emulator may receive a request to identify the value of VertexAttrib #0 using glGetVertexAttrib at block 702. Again, rather than calling the real glGetVertexAttrib, the emulator calls a wrapped version of this function at block 704. At block 707, the emulator determines whether VertexAttrib #0 is set to a constant value. For example, referring to the flow diagram of FIG. 5, the emulator may query the state of VertexAttrib #0. If VertexAttrib #0 is not set to use a constant value, the emulator may call the real glGetVertexAttrib at block 708. If VertexAttrib #0 is set to use a constant value, the emulator may identify the stored constant value as the constant value at block 710.

Querying OpenGL to identify whether VertexAttrib #0 is using a constant value may be very slow. In order to allow the system to avoid querying OpenGL, the emulator may use wrapped versions of functions which return a generic vertex attribute parameter in response to a user request and which enable or disable a generic vertex attribute array. For example, in OpenGL, the value of VertexAttrib #0 may be queried using the function glGetVertexAttrib and glEnableVertexAttribArray or glDisableVertexAttribArray may be called to enable or disable an array. Accordingly, the emulator may use wrapped versions of these functions in order to allow the user to query OpenGL for the constant value.

For example, when the user calls the glVertexAttrib function to set the value of a VertexAttrib, the emulator may actually call the wrapped version of this function. If the user is attempting to set VertexAttrib #0 to a constant value, the wrapped glVertexAttrib function may be used to remember this constant value. The real glVertexAttrib function may also be called, and VertexAttrib #0 may be set to the constant value.

The emulator may also use wrapped versions of glDisableVertexAttribArray and glEnableVertexAttribArray. When the user calls glDisableVertexAttribArray for VertexAttrib #0, the user may be using a constant. Similarly, when the user calls glEnableVertexAttribArray for VertexAttrib #0, the user may be using an array. When the user calls these functions, the emulator may actually call the wrapped versions. The wrapped versions may be used to track the use of these functions and store the current state of these functions.

Accordingly, when the user calls a glDraw function, the emulator may call the wrapped version of the glDraw function and use the wrappers to identify the current state of glDisableVertexAttribArray and glEnableVertexAttribArray wrappers. The emulator may determine whether VertexAttrib #0 is set to use a constant value or an array without querying OpenGL. If VertexAttrib #0 is set to use an array, the emulator may call the real glDraw function and complete the draw. If VertexAttrib #0 is set to use a constant value, the emulator may use the constant value stored by the glVertexAttrib wrapper to identify the value and generate an array as described above, again without querying OpenGL.

In some examples, if the emulator has previously generated a new array to complete a draw, the new array may be stored for later use. For example, the wrapped version of the glDraw function may store the value which was used to generate the new array. If the value of the constant has not changed, and if the new array is large enough to supply the constant value needed for the draw, the emulator may use the same array.

Figure 6:
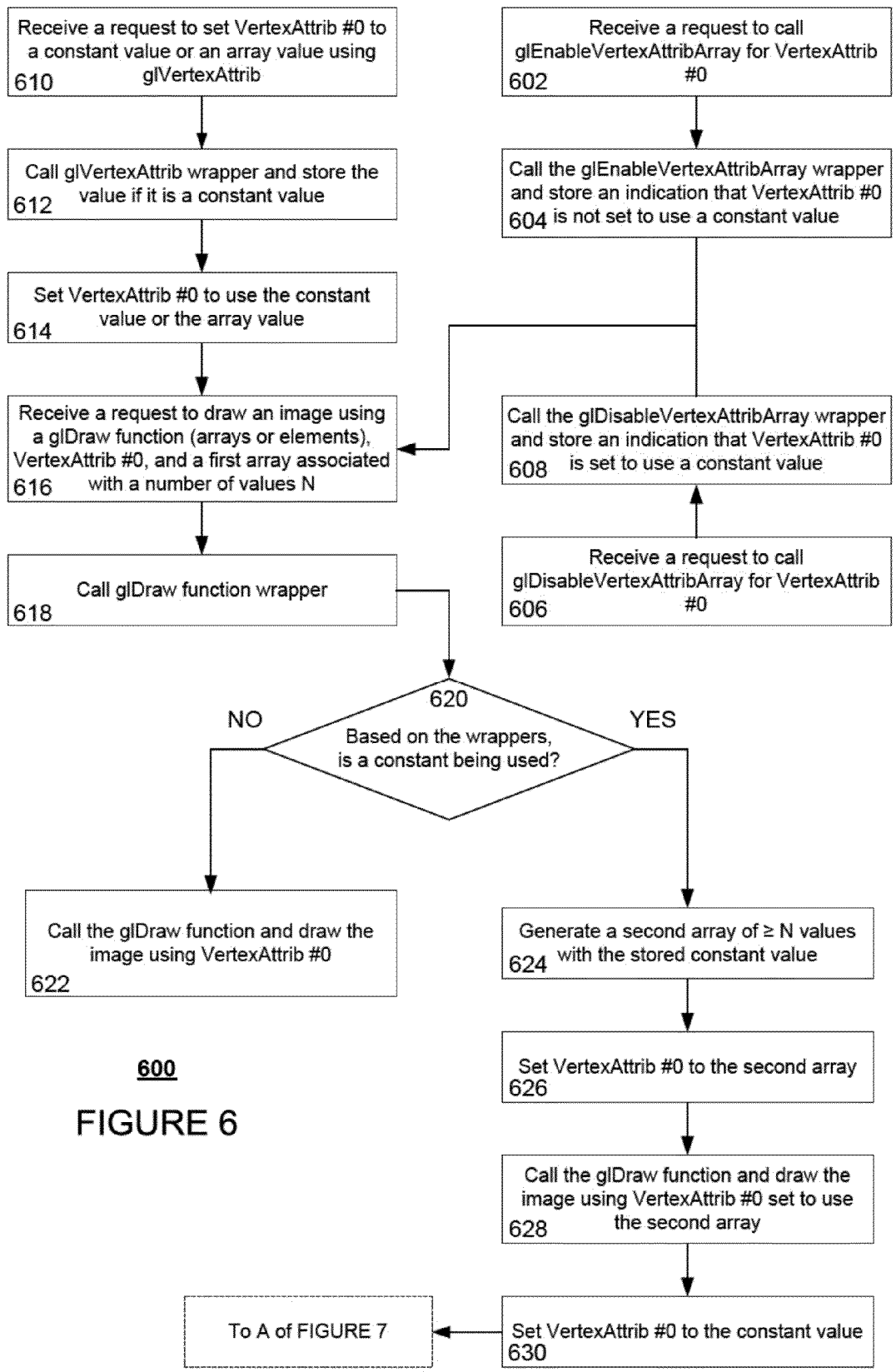
FIG. 6 is another exemplary flow diagram in accordance with an aspect of the invention.

As shown in flow diagram 600 of FIG. 6, the emulator may use wrapped versions of glDisableVertexAttribArray and glEnableVertexAttribArray to track whether VertexAttrib #0 is set to a constant value. For example, at blocks 602 and 606, the emulator may receive requests to call the glEnableVertexAttribArray or glDisableVertexAttribArray for VertexAttrib #0. Rather than calling the real versions of these functions, the emulator calls wrapped versions. For example, at block 604, the emulator calls a wrapped version of glEnableVertexAttribArray and stores an indication that VertexAttrib #0 is not set to use a constant value. Similarly, at block 608, the emulator calls a wrapped version of glDisableVertexAttribArray and stores an indication that VertexAttrib #0 is set to use a constant value.

The emulator receives a request to set VertexAttrib #0 to a constant value or an array value using the function glVertexAttrib at block 610. The glVertexAttrib wrapper is called to store the value if it is a constant value at block 612. Next, the real glVertexAttrib function is called to set VertexAttrib #0 to the requested value (either the constant value or the array value) at block 614. The emulator then receives a request to draw an image using a glDraw function, either glDrawArrays or glDrawElements, using an array associated with a number of values N at block 616. The emulator calls the glDraw function wrapper at block 618. The emulator next determines whether VertexAttribute #0 is a constant value based on the indications stored using the glDisableVertexAttribArray and glEnableVertexAttribArray wrappers at block 620. Alternatively, the emulator may query OpenGL to determine whether VertextAttribute #0 is set to use arrays. If VertextAttribute #0 is set to use arrays, the emulator calls the real glDraw function to use VertexAttrib #0 to draw the image at block 622.

Returning to block 620, if based on the indications stored by the glDisableVertexAttribArray and glEnableVertexAttribArray wrappers VertexAttrib #0 is a constant value, the emulator generates an array of at least N values filled with the stored constant value at block 624. VertexAttrib #0 is set to use the second array at block 626. The emulator then calls the glDraw function identified in the request to draw the image, and draws the image using the second array at block 628. VertexAttrib #0 is then set to use the constant value at block 630.

As shown in flow diagram 700 of FIG. 7, after VertexAttrib #0 has again been set to use the constant value, for example, at block 630 of FIG. 6, the emulator may receive a request to identify the value of VertexAttrib #0 using glGetVertexAttrib at block 702. Again, rather than calling the real glGetVertexAttrib, the emulator calls a wrapped version of this function at block 704. At block 707, the emulator determines whether VertexAttrib #0 is set to a constant value. For example, referring to the flow diagram of FIG. 6, the emulator may examine to the glEnableVertexAttribArray and glDisableVertexAttribArray wrappers. If VertexAttrib #0 is not set to use a constant value, the emulator may call the real glGetVertexAttrib at block 708. If VertexAttrib #0 is set to use a constant value, the emulator may identify the stored constant value as the constant value at block 710.

As these and other variations and combinations of the features discussed above can be utilized without departing from the invention as defined by the claims, the foregoing description of exemplary embodiments should be taken by way of illustration rather than by way of limitation of the invention as defined by the claims. It may also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method comprising:
receiving a request to set an attribute to use a particular constant value by utilizing a first function;
calling a second version of the first function;
using the second version of the first function to store the particular constant value;
setting the attribute to use the particular constant value;
receiving a request to draw an image using a second function, the attribute, and a first array of N values;
determining, by a processor, whether the attribute is set to use a constant value; and
if the attribute is set to use a constant value:
  (1) generating, by the processor, a second array of at least N values based on the stored particular constant value; and
  (2) calling the second function to draw the image using the second array.

2. The method of claim 1, further comprising:
after generating the second array, setting the attribute to the second array;
drawing the image using the attribute set to the second array; and
after drawing the image, setting the attribute to use the particular constant value.

3. The method of claim 1, further comprising:
receiving a request to identify the attribute using a third function;
calling a second version of the third function to retrieve the stored constant value of the second version of the first function; and
identifying the stored constant value as the attribute.

4. The method of claim 1, wherein determining whether the attribute is set to use a constant value is based on querying the attribute.

5. The method of claim 4, wherein if the attribute is not set to use a constant value, the method further comprises:
  (1) calling the second function; and
  (2) drawing the image using the attribute.

6. The method of claim 1, further comprising:
tracking use of a third function that enables generic vertex attribute arrays in conjunction with the attribute; and
tracking use of a fourth function that disables generic vertex attribute arrays in conjunction with the attribute;
wherein determining whether the attribute is set to use a constant value is based on the use of the third function in conjunction with the attribute and the use of the fourth function in conjunction with the attribute.

7. The method of claim 6 wherein if the attribute is not set to use a constant value, the method further comprises:
  (1) calling the second function; and
  (2) drawing the image using the attribute.

8. A computer comprising:
memory storing a graphics library including a plurality of functions;
a processor coupled to the memory, the processor being programmed to:
receive a request to set an attribute to use a particular constant value by utilizing a first function;
call a second version of the first function;
use the second version of the first function to store the particular constant value;
set the attribute to use the particular constant value;
receive a request to draw an image using a second function, the attribute, and a first array of N values;
determine whether the attribute is set to use a constant value; and
if the attribute is set to use a constant value, then:
  (1) generate a second array of at least N values based on the stored particular constant value; and
  (2) call the second function to draw the image using the second array.

9. The computer of claim 8, wherein the processor is further programmed to:
after generating the second array, set the attribute to the second array;
draw the image using the attribute set to the second array; and
after drawing the image, set the attribute to use the particular constant value.

10. The computer of claim 8, wherein the processor is further programmed to:
receive a request to identify the attribute using a third function;
call a second version of the third function to retrieve the stored constant value of the second version of the first function; and
identify the stored constant value as the attribute.

11. The computer of claim 8, wherein the processor is further programmed to determine whether the attribute is set to use a constant value based on querying the attribute.

12. The computer of claim 11, wherein if the attribute is not set to use a constant value, the processor is further programmed to:
  (1) call the second function; and
  (2) draw the image using the attribute.

13. The computer of claim 8, wherein the processor is further programmed to:
track use of a third function that enables generic vertex attribute arrays in conjunction with the attribute; and
track use of a fourth function that disables generic vertex attribute arrays in conjunction with the attribute;
wherein determining whether the attribute is set to use a constant value is based on the use of the third function in conjunction with the attribute and the use of the fourth function in conjunction with the attribute.

14. The computer of claim 13, wherein if the attribute is not set to use a constant value, the processor is further programmed to:
  (1) call the second function; and
  (2) draw the image using the attribute.

15. A non-transitory computer-readable storage medium on which computer readable instructions of a program are stored, the instructions, when executed by a processor, causing the processor to perform a method of drawing an image using an array, the method comprising:
receiving a request to set an attribute to use a particular constant value by utilizing a first function;
calling a second version of the first function;
using the second version of the first function to store the particular constant value;
setting the attribute to use the particular constant value;
receiving a request to draw an image using a second function, the attribute, and a first array of N values;
determining whether the attribute is set to use a constant value; and
if the attribute is set to use a constant value:
  (1) generating a second array of at least N values based on the stored particular constant value; and
  (2) calling the second function to draw the image using the second array.

16. The non-transitory computer-readable storage medium of claim 15, wherein the method further comprises:
- after generating the second array, setting the attribute to the second array;
- drawing the image using the attribute set to the second array; and
- after drawing the image, setting the attribute to use the particular constant value.

17. The non-transitory computer-readable storage medium of claim 15, wherein the method further comprises:
- receiving a request to identify the attribute using a third function;
- calling a second version of the third function to retrieve the stored constant value of the second version of the first function; and
- identifying the stored constant value as the attribute.

18. The non-transitory computer-readable storage medium of claim 15, wherein determining whether the attribute is set to use a constant value is based on querying the attribute.

19. The non-transitory computer-readable storage medium of claim 18, wherein if the attribute is not set to use a constant value, the method further comprises:
(1) calling the second function; and
(2) drawing the image using the attribute.

20. The non-transitory computer-readable storage medium of claim 15, wherein the method further comprises:
- tracking use of a third function that enables generic vertex attribute arrays in conjunction with the attribute; and
- tracking use of a fourth function that disables generic vertex attribute arrays in conjunction with the attribute;
- wherein determining whether the attribute is set to use a constant value is based on the use of the third function in conjunction with the attribute and the use of the fourth function in conjunction with the attribute.

21. The non-transitory computer-readable storage medium of claim 20, wherein if the attribute is not set to use a constant value, the method further comprises:
(1) calling the second function; and
(2) drawing the image using the attribute.

* * * * *